United States Patent [19]
Rudder, Jr.

[11] 3,899,195
[45] Aug. 12, 1975

[54] FRONT MOUNTED VEHICLE HITCH

[76] Inventor: Robert C. Rudder, Jr., 2136 McKinley Rd. N.W., Atlanta, Ga. 30318

[22] Filed: Sept. 10, 1973

[21] Appl. No.: 396,079

[52] U.S. Cl............. 280/481; 280/491 R; 280/511; 293/69 R
[51] Int. Cl.²........................ B60D 3/00; B60D 1/06
[58] Field of Search........... 280/481, 491 R, 491 E, 280/511, 500, 502, 492, 493, 494; 293/69 R

[56] References Cited
UNITED STATES PATENTS

| | | | |
|---|---|---|---|
| 2,521,132 | 9/1950 | Smith................................... | 280/511 |
| 2,818,277 | 12/1957 | McElhoe........................ | 280/491 R |
| 2,830,829 | 4/1958 | Gensinger et al.............. | 280/491 R |
| 2,871,030 | 1/1959 | Hollis.................................. | 280/492 |
| 3,083,479 | 4/1963 | Knight............................ | 280/481 X |
| 3,463,514 | 8/1969 | Warner............................... | 280/495 |
| 3,528,684 | 9/1970 | Cowgill.............................. | 280/456 |
| 3,717,362 | 2/1973 | Johnson.......................... | 280/415 A |

Primary Examiner—Leo Friaglia
Attorney, Agent, or Firm—Patrick F. Henry

[57] ABSTRACT

A vehicle hitch which includes a drawbar and a hitchball is attached to the front bumper and frame or chassis of a truck or automobile. A trailer coupling is mounted on the ball of the front mounted hitch and the trailer may be guided from the front rather than the rear. In one preferred form the front mounted hitch has a spaced plate which fits over one edge of the chassis of the vehicle and another, intermediate projecting plate which may be attached through one of the conventional bumper bolts. It is easier and safer to maneuver by pulling and pushing another vehicle from the front of the driven vehicle than from the rear.

4 Claims, 5 Drawing Figures

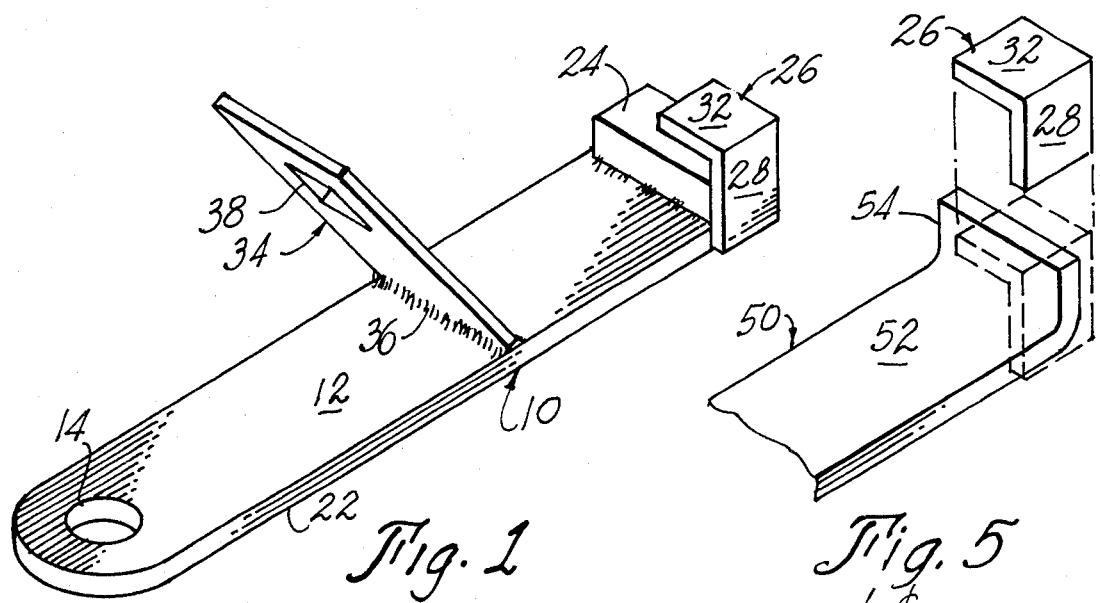
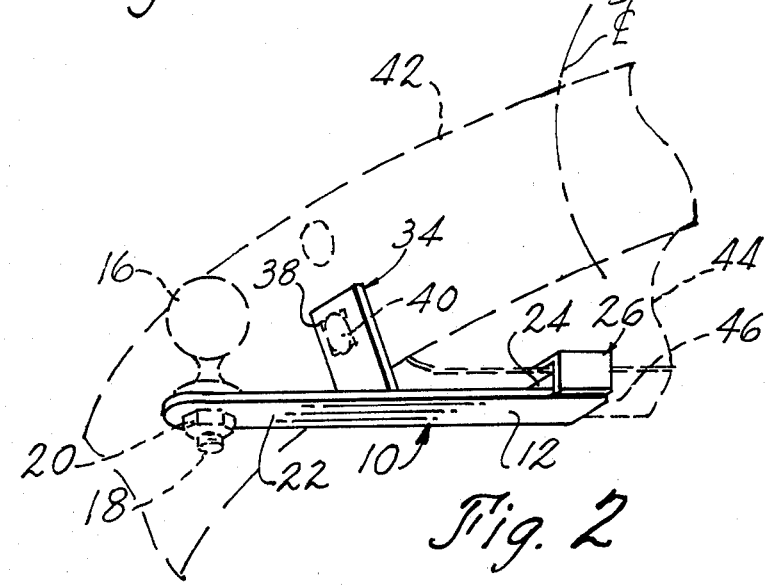
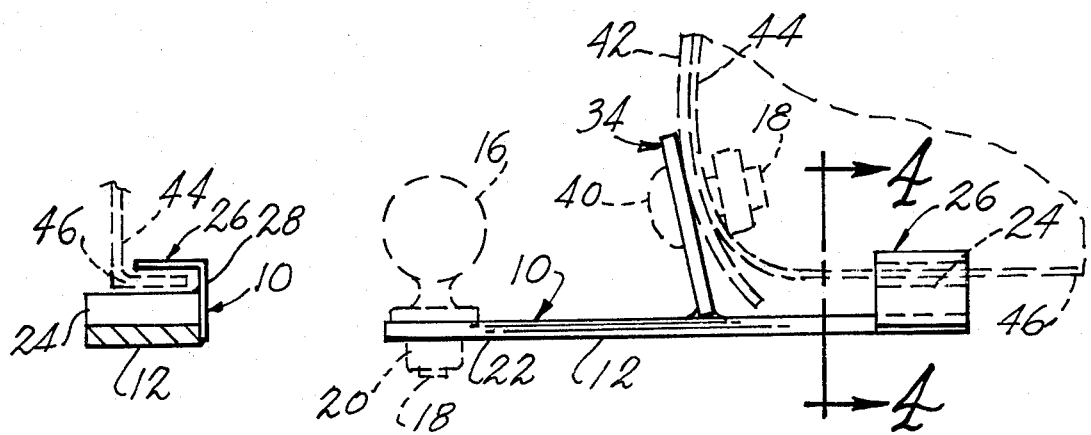

FRONT MOUNTED VEHICLE HITCH

BACKGROUND OF THE INVENTION

1. Field of the Invention

Vehicles, towing and trailering; tandem vehicles; hitching and coupling devices. (Class 280 Subclasses 408, 472, 481, 493, 494 and 511 would appear to be involved.)

2. Description of the Prior Art

The common method of moving a tandem vehicle and especially for maneuvering a trailer is the conventional trailer hitch comprising the drawbar and ball on the lead vehicle and the coupling device on the trailer which has a cavity fitting over the ball. Of course, on heavier vehicles such as large highway tractor-trailer trucks the fifth wheel arrangement is used. While this is the most satisfactory method of transporting another vehicle on the highway and at higher speeds it involves certain problems in close quarters and when attempting to place the trailer vehicle in a confined spot in a congested area. A trailer is not visible to the driver of a pick-up truck camper unit even in daylight and any towed trailer at the rear is difficult to see in the dark but very visible at the front in the headlights. Some trailers do not respond very well due to the location of the wheels and the distance from the lead vehicles and other factors and tend to jackknife when pushed by the lead vehicle. Also, in launching boats from a concrete ramp which leads into the water it is sometimes difficult not only to back the trailer vehicle into the concrete ramp but also this places the towing vehicle which may be a passenger car or pickup truck with the rear drive wheels downhill and very often under water. Ofttimes when removing a boat from the water on the trailer the rear wheels of the lead, towing vehicle will spin and slip and it is sometimes necessary to obtain assistance to get enough traction to move the trailer onto the ramp. Therefore, there are many advantages of safety, convenience and otherwise in having a front mounted hitch and manipulating another vehicle from the front while looking forward rather than from the rear.

The following patents are noted: U.S. Pat. Nos. 2,130,108 and 2,779,620.

SUMMARY OF THE INVENTION

The purpose of this invention is to provide a means on the front of a vehicle, such as a conventional passenger car or pickup truck or any other type of vehicle, by which another, second vehicle, such as a boat trailer, may be coupled temporarily for the purpose of maneuvering said second vehicle from the front rather than from the rear.

An object of this invention is to provide a front mounted vehicle hitch which may be used when it is desired to push and pull another vehicle from the front of the driven vehicle while the driver looks forward.

An additional object of this invention is found in the particular construction of a preferred embodiment of the invention whereby the hitch is slipped over an edge of one of the chassis frame members and bolted in place by means of one of the bumper bolts which may be offcenter from the centerline of the vehicle.

An advantage of this invention is found in the offcenter arrangement of the hitch whereby better maneuverability and visibility is obtained under certain conditions.

Still another object of the present invention is to provide a chassis mounted and bumper mounted hitch which is simply manufactured by welding heavy metal plates onto a drawbar.

BRIEF DESCRIPTION OF THE DRAWING

FIG. 1 is a perspective view of a preferred form of the present front mounted hitch.

FIG. 2 is a side elevation perspective view of the hitch shown in FIG. 1 mounted on the front bumper and a portion of the chassis frame of a typical pickup truck.

FIG. 3 is a side elevation view of the assembly shown in FIG. 2.

FIG. 4 is a cross-sectional view taken along lines 4—4 in FIG. 3.

FIG. 5 is a perspective view with portions broken away of a modified form of the hitch shown in FIG. 1.

DESCRIPTION OF A PREFERRED EMBODIMENT

In FIG. 1 the hitch is designated generally by reference numeral 10 and comprises a heavy, elongated plate or bar 12, usually known as a drawbar, which may be made of extremely strong steel that may be heavily chrome-plated. The front of the drawbar is curved on the end and has a hole 14 therein to receive a conventional ball 16 which is commonly found in the usual hitch and coupling arrangement. The ball 16 is attached to a threaded shaft 18 with an assembly nut 20 holding the ball 16 in place in the hole 14 against the bottom 22 of the drawbar 12.

The rear end of the bar 12 has a block of steel 24 welded thereto and extending thereabove serving in one capacity as a spacer. A steel angle member 26 has the bottom edge welded to the bar 12 and includes a vertical plate portion 28 extending above bar 12 and block 24 and having a horizontal portion 32 spaced from and extending over block 24. A bumper mounting plate designated generally by reference numeral 34 is welded at 36 transversely across the bar 12 and extends at less than a 90 degree angle outwardly from above the bar 12 from the front end thereof. Plate 34 has a rectangular opening 38 therein through which is mounted a conventional bumper bolt 40 on the usual vehicle bumper 42 as shown in FIG. 2. A front chassis frame member 44 of the vehicle has a horizontal plate portion 46 on the bottom edge thereof and the block 24 is placed beneath the bottom of the plate 46 and the plate 32 is placed thereover after having temporarily removed the bumper bolt 40 from bumper 42. Then the hole 38 in the plate 34 is aligned with the hole in the bumper 42 and the bolt 40 is replaced completing the mounting of the entire front mounted hitch 10.

It is noted that the bumper bolt 40 is off-center from the approximate centerline CL of the bumper 42 which places the hitch 10 in the present embodiment on the passenger or righthand side of the vehicle. This is advantageous in some situations as it gives better visibility and control to the driver sitting on the lefthand or the driver's side. It should be noted that the hitch 10 may be mounted in the center or to one side or the other of the center of the bumper 42 as desired.

In the modified form shown in FIG. 5 which is designated for purpose of identification by reference numeral 50, the drawbar 52, instead of having the solid block 24 as in the previous drawbar 12, is made by bending the end upwardly at a vertical angle to provide an upstanding spacer 54 to which is attached the angle member 26 by welding same to the drawbar 52.

While I have shown and described a particular embodiment of this invention together with a suggested modification thereof and have indicated a mode and manner of use, this if for purpose of illustration only and does not constitute any sort of limitation on the scope of my invention since various alterations, changes, deviations, amendments, revisions, additions, omissions, combinations and departures, may be made in the embodiments shown without departing from the scope of my invention as defined only by a proper interpretation of the appended Claims.

I claim:

1. In a front mounted vehicle hitch for an occupant-driven vehicle:
   a. an occupant-driven vehicle having a front and having a vehicle frame member extending from said front rearwardly on said vehicle,
   b. an elongated hitch bar having a retainer member attached thereto and spaced therefrom defining a space between said retainer member and hitch bar for receiving said frame member therein whereby said hitch bar is mounted on said vehicle frame member at a position spaced from the front of said vehicle,
   c. a mounting plate attached to and projecting away from said bar intermediate the length thereof and spaced from said retainer member thereon, said mounting plate being attached to said frame at another location thereon from said retainer and forwardly of said vehicle therefrom.

2. the device in claim 1 wherein: said front of said vehicle has a bumper mounted thereon and said bumper having at least one removable bumper bolt attaching said bumper to said frame, said mounting plate being attached to said bumper and frame by said bumper bolt which may be done when adding said hitch to a previously assembled vehicle by removing said bolt and replacing same.

3. The device claimed in claim 1 wherein said spacer member is a solid block welded to said bar.

4. The device claimed in claim 1 wherein said spacer member is formed by bending the end of said drawbar upwardly.

* * * * *